United States Patent [19]

Uehlinger et al.

[11] 4,096,731
[45] Jun. 27, 1978

[54] METHOD AND A MEANS FOR TRANSFERRING ARTICLES, IN PARTICULAR SEMIMANUFACTURED ARTICLES OR WORKPIECES, BETWEEN STATIONS ON MACHINERY FOR WORKING THESE ARTICLES MECHANICALLY

[75] Inventors: Werner Uehlinger, Arlesheim; Pius Wendelspiess, Binningen, both of Switzerland

[73] Assignee: KM-Engineering AG, Basel, Switzerland

[21] Appl. No.: 638,360

[22] Filed: Dec. 8, 1975

[30] Foreign Application Priority Data

Sep. 22, 1975 Switzerland .................... 12256/75

[51] Int. Cl.² ............................................. B21D 43/18
[52] U.S. Cl. ............................... 72/405; 113/113 A; 193/25 FT; 198/345; 302/24; 214/1 BE; 214/152
[58] Field of Search .................. 214/1 B, 1 BE, 8.5 E, 214/152; 198/19, 345; 302/2 R, 24; 72/405; 113/113 A; 193/25 R, 25 FT

[56] References Cited

U.S. PATENT DOCUMENTS

| 3,099,494 | 7/1963 | Heinze | 193/25 R X |
|---|---|---|---|
| 3,105,720 | 10/1963 | Barker | 302/2 R |
| 3,129,978 | 4/1964 | Szatkowski | 302/2 R |
| 3,529,706 | 9/1970 | Bru | 193/25 X |
| 3,684,327 | 8/1972 | Hurd | 302/2 R |
| 3,693,965 | 9/1972 | Mitsengendler | 214/1 BE X |
| 3,941,070 | 3/1976 | Kaminski | 302/2 R X |

*Primary Examiner*—Drayton E. Hoffman
*Assistant Examiner*—George F. Abraham
*Attorney, Agent, or Firm*—Lowe, Kine, Price & Markva

[57] ABSTRACT

A method and apparatus is provided for transferring articles between successive work stations at which working operations are effected. More particularly, the workpieces are transferred between the forming stations on a multistage forming press. On completion of a machining operation, a burst of the coolant/lubricant emulsion used in the forming press is fired at the workpiece from a propelling nozzle located near the forming station. The workpiece is thus propelled to the next station along a curved guideway which comprises a smooth, curved track bounded by guiderails. On arrival at the next station, the workpiece is guided into position by guide members and finally positioned exactly by means of a burst of the same coolant/lubricant emulsion fired from a positioning nozzle located near the station. Regulating mechanisms are provided to fire bursts of emulsion in time with the working stroke of the press.

31 Claims, 7 Drawing Figures

METHOD AND A MEANS FOR TRANSFERRING ARTICLES, IN PARTICULAR SEMIMANUFACTURED ARTICLES OR WORKPIECES, BETWEEN STATIONS ON MACHINERY FOR WORKING THESE ARTICLES MECHANICALLY

BACKGROUND OF THE INVENTION

The invention relates to a method for transferring articles, in particular semimanufactured articles or workpieces, on machinery for working these articles mechanically. The articles to be processed are machined at two or more successive stations and are transferred at a predetermined frequency directly or via one or more intermediate stations from one tool to the next tool, are positioned at each tool and subjected to a machining operation.

The invention also includes a device for carrying out this process.

In the automatic manufacture of metal containers, e.g. metal cans, on a multi-stage press a cup is first preformed by deep drawing. The cup then undergoes a succession of machining operations at several forming stations situated one behind the other. These operations reduce the wall thickness by ironing, the container height being increased accordingly. It is of the utmost importance during these operations that the pressings are transferred from one forming station to the next exactly in time with the working stroke of the press.

Attempts at manufacturing thin-walled hollow components for use as containers at high production rates on multi-stage presses have hitherto been unsuccessful because no transfer system exists which is suitable for this special application. An arrangement in which grippers are attached to two bars is in fact already known and is assessed in detail below, but the considerable weight of its moving parts and its inability to ensure that the workpieces are centered with the necessary precision at the new forming station has discouraged its application to the manufacture of thin-walled hollow components on high-speed machines with their correspondingly large tool separations.

A known transfer system which can be used for this purpose has for instance two parallel bars which are positioned one on each side of the line of forming stations and provided with rigid, curved gripper-halves. The mutual separation of these gripper-halves corresponds to the distance between the individual forming stations. The bars are mechanically positively driven so that they describe a periodic motion comprising the following steps. Firstly the bars move inwards so that each pair of gripper-halves grips a workpiece. The workpieces are then advanced by the distance between two adjacent forming stations. The bars are moved outwards, thus lifting the gripper-halves away from the workpieces, and subsequently brought back to their starting positions.

Although such systems have proved themselves effective in transferring relatively thick-walled metal containers at lower production rates, they break down — as tests have shown — as soon as higher stroke rates (e.g. 120 – 200 per minute) are attempted or when thin-walled and surface-sensitive metal containers are involved.

The relatively large inertia of the bars carrying the gripper-halves sets a limit beyond which the stroke rate cannot be increased. The continuously alternating acceleration and deceleration necessary above this limit can simply not be attained.

At higher stroke rates the gripper-bars knock against the workpieces and damage them.

A further disadvantage of known devices like this one lies in the fact that their use with machinery having two parallel lines of forming stations is either impossible or subject to the acceptance of significant disadvantages. After releasing the workpieces the bars must move quite a long way outwards from the machining line in order to avoid the curved side-walls of the workpieces. Thus it would be necessary to incorporate a wide free space between the two inner rails of a double-track conveyor system. This would considerably increase the space required for the machinery and also involve additional costs.

For these reasons transfer systems of this kind equipped with parallel gripper-bars have not yet been employed for transferring thin-walled, surface-sensitive containers on high-speed, multi-stage presses. Since the most recent efforts in the field of non-cutting machining have been aimed at a continuous increase in stroke rate and hence in productivity (cf. for instance U.S. Pat. No. 3,924,437, Ser. No. 330,921, which is included by way of reference), the use of these known transfer systems has reached a limit which makes it necessary now to proceed in a different and fundamentally novel direction.

It is well known to those skilled in the art that elastically biased grippers are also used for transferring workpieces on automatic, multistage presses. This sort of transfer method makes use of pivotally mounted, elastically biased gripper-arms which work in pairs and are mounted on a reciprocatingly driven sled. To grip a workpiece, two associated gripper arms are caused by the movement of the sled to encircle the workpiece, working against the elastic biasing force. To release the workpiece the gripper arms are withdrawn again. During these operations the gripper jaws, which are not positively controlled, rub against the sensitive surface of the metal container which in general has a wall thickness of only 0.3 to 0.08 mm and is therefore often dented and/or scratched after being transferred in this way. This makes the subsequent laquering and printing processes more difficult or even quite impossible to carry out.

These elastically biased grippers, together with their associated sled, also have a relatively high inertia and make a lot of noise when gripping a workpiece. As the work rate is increased the intensity of this noise can in fact rise to unbearable levels.

In addition, the working surfaces of elastically biased grippers suffer from a high rate of wear, since a very hard material clearly cannot be used for them. This can lead to the gripping surfaces having to be replaced within a few days if the machinery is operated continuously.

It can thus readily be appreciated that elastically biased grippers no longer measure up to the demands made by modern forming technology on devices for transferring workpieces.

The object of this invention is therefore to create a transfer means which by virtue of the low inertia of its moving parts permits an extremely high stroke rate and yet transfers the workpieces gently and positions them exactly.

SUMMARY OF THE INVENTION

The present invention achieves this object by arranging that on completion of a machining operation each workpiece receives a translational impulse in the form of a liquid jet or a mixed gas/liquid jet fired through a propelling nozzle aimed at the workpiece, and is subsequently guided by means of at least one guide member to the next machining station where it is positioned.

The means used for putting this method into practice are characterized in that each station is connected to its neighboring station by a guideway having at least one guide member. In addition, at least one receiving member and at least one propelling nozzle are positioned in the neighborhood of each station, the propelling nozzle being fed with a liquid, a liquid/liquid mixture or a liquid/gas mixture and the jet emerging from the nozzle being adjustable to control the rate at which workpieces are handled.

It has been possible to demonstrate experimentally that this solution gives the following advantages:

1. There is no moving transfer apparatus and therefore no masses which have to be accelerated. In contrast to known equipment, which in order to transfer a workpiece weighing 100 g, has to accelerate and decelerate a sled mass of at least 60 kg at least 100 times within a minute, the new transfer system works under practically inertia-free conditions.
2. As a result of this independence from the inertia of transfer members the press can, as tests have shown, readily operate at a work rate of 200 to 250 strokes per minute. The new transfer means can therefore be adapted to even the fastest known machining equipment.
3. As a result of the elimination of mechanical drive parts the mutual separation of the stations of a multi-stage press may be chosen at will, the choice of transfer paths being left completely to the designer. It is worth noting that the invention can also be used to transfer workpieces from a multi-stage press to another unit in the same production line.
4. The transfer means works at an extremely low noise level since the direct contact of metal on metal is eliminated.
5. Sensitive workpieces, such as extremely thin-walled metal cans or plastic workpieces, can be transferred gently since there is no mechanical contact between the transfer members and the workpieces.
6. The transfer means can be regulated and adapted very simply since the quite separated nozzles are easier to adjust than the intricately interlocking parts of a mechanical system.
7. Energy is saved through the elimination of massive moving parts.
8. The transfer means requires as good as no additional lateral space. Hence several machining units set up in parallel require little extra space.
9. The individual components of the transfer means hardly suffer at all from wear.
10. Maintenance of the transfer means is extremely simple.
11. The transfer means exhibits extraordinary flexibility as regards its conversion to different product sizes. As is well known, the conversion of mechanical transfer systems to handle a different product requires the replacement of a large number of the mechanical parts, and certainly all the gripper arms.
12. Should major alterations ever in fact be necessary, then the novel transfer means can be replaced as one unit.

BRIEF DESCRIPTION OF DRAWINGS

The accompanying drawing shows an illustrative embodiment and also includes several constructional variants.

DESCRIPTION OF SPECIFIC EMBODIMENTS

Figure 1:
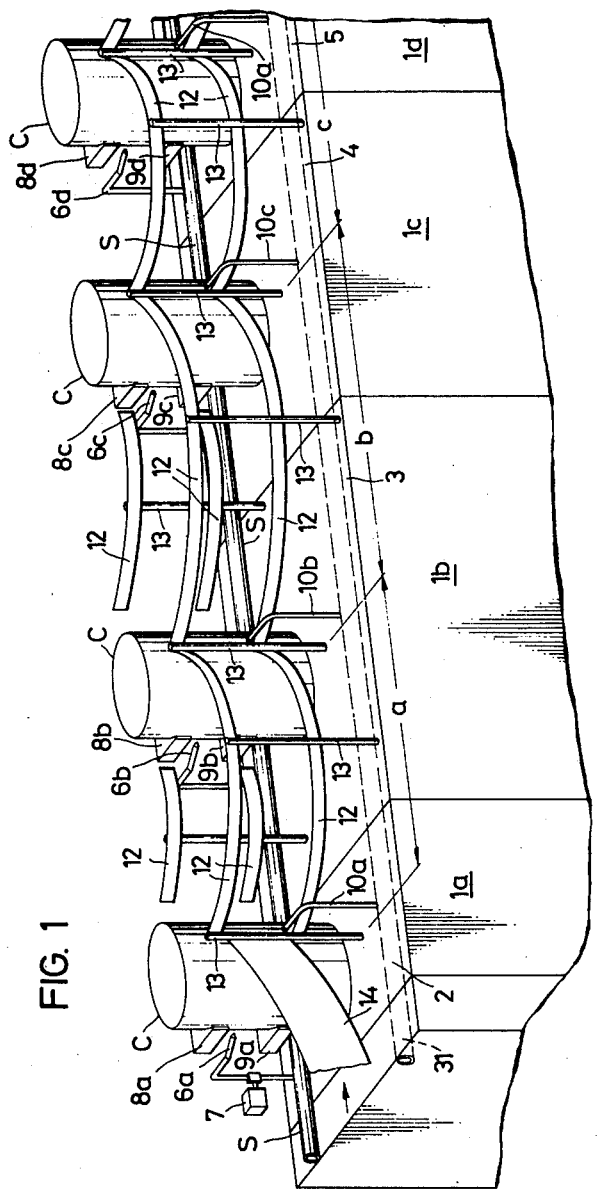
FIG. 1 is a simplified perspective representation of the transfer means on a multi-stage forming press for the non-cutting production of hollow metal components.
Figure 2:
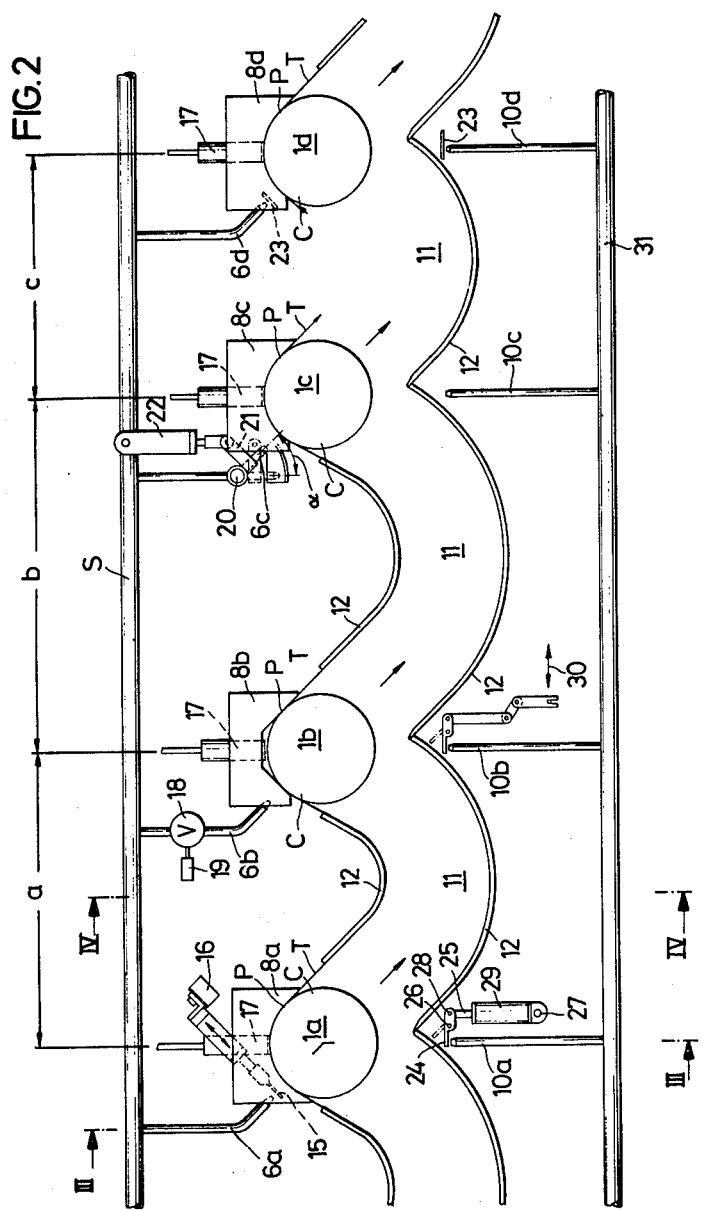
FIG. 2 is a plan view of a similar device.

FIGS. 1 and 2 show equipment for producing metal cans on which the workpieces are transferred from one forming tool to the next. The system chosen as an example has several forming stations 1a, 1b, 1c and 1d lying behind each other in the direction in which the workpieces advance. The axes of these stations are spaced at various intervals a, b and c. Each of forming stations 1a to 1d has a tool lower section 2,3,4,5 above which a tool upper section (not illustrated) is positioned. A preshaped blank C is pushed through a drawing die in the tool lower section by a punch situated in the tool upper section and is thus ironed. The details of the forming process and the apparatus necessary for it are of no importance to the present invention but are described in Swiss Patent No. 550,620 which is included by way of reference. After each forming operation the workpiece must be transferred to the next station in time with the stroke of the forming tools. The means by which this is accomplished is the subject of the present invention and is described below.

In FIGS. 1 and 2 a propelling nozzle 6a, 6b, 6c, 6d is positioned at each forming station. Each propelling nozzle is connected via a common line S to the cooling and lubricating system and is fed with the coolant and lubricant emulsion already present in the press.

The device illustrated will be described for the case in which the fluid supplied to the propelling nozzles is only a coolant and lubricant emulsion. This represents on presses of this kind a preferred embodiment of the method of the invention. It should however be expressly pointed out that the transfer means may also be operated using other liquids such as mains water, or even with a liquid/gas mixture (e.g. water/air). Supplying the propelling nozzles exclusively with a gas (e.g. compressed air) has proved to be unsuccessful and will not therefore be considered.

Propelling nozzle 6a has an associated control valve 7 which cuts off and again releases the supply of emulsion in time with the stroke of the press. Thus when the press is in operation, bursts or jets of emulsion follow each other in very rapid succession out through the mouth of the propelling nozzle 6a. The frequency of emission of these bursts can be very simply adjusted by means of the control valve 7. The jet strength can also be regulated using known control means.

Each forming station has in addition two receiving members 8a, 8b, 8c, 8d and 9a, 9b, 9c, 9d (cf FIG. 2 also). The contours of the receiving members are designed to fit the workpiece C, which is to be transferred along the forming line, and may be made of rubber or plastic for instance. Their hardness and profile should be chosen to suit the material, shape and speed of the workpieces C so that the workpieces are caught cleanly without rebounding and can be positioned exactly. It would of course also be possible for each station to be equipped with a larger number of receiving members than the two shown in FIG. 1, or with only one. The receiving members could be made of metal for example, and have a fluid cushion (e.g. an air cushion) mounted on their receiving surfaces.

The receiving members are positioned so that workpieces C arriving at a forming station are brought to a halt in exactly the position required for the forming process. To ensure rapid and accurate positioning under all circumstances, positioning nozzles 10a, 10b, 10c, 10d are provided on the far side of the workpiece C from the receiving members. The jets emitted by the positioning nozzles (also an emulsion of coolant and lubricant) is aimed at the side wall of the workpiece. The supply to these positioning nozzles is regulated by control members so that they also operate in time with the working rythm of the press. The control members are described later in connection with FIG. 2. In contrast to the propelling nozzles, the positioning nozzles can deliver a continuous, i.e., uninterrupted, jet (nozzle 10c/FIG. 2) and, depending on the requirement, may also be supplied with gas only, e.g. compressed air.

The transfer means also includes curved guideways 11 (FIG. 2) which run between neighbouring forming stations 1a/1b, 1b/1c, etc. and on the track of which the bottom surface of the workpiece C slides. The workpieces C are guided on both sides of each guideway 11 by bent guiderails 12. These guiderails 12 may, as shown in FIG. 1, be strips of sheet stainless steel or of plastic and are attached to supports 13. A special input guide in the shape of a broad strip is mounted at the entrance to the first forming station. The guiderails can also be designed basically as broad strips. In most cases it would probably be sufficient for the workpiece C to be guided by a single guide member defining the outer boundary of the guideway 11 (cf the guideway between stations 1c and 1d).

The means described above operates as follows:

The blank C which arrives at forming station 1a is first brought into the exact machining position against receiving members 8a/9a by means of a short burst of fluid from positioning nozzle 10a. The blank C is then ironed by the punch (not illustrated), being pushed into tool lower section 2. As soon as this first forming process is complete and the workpiece has regained its position at the transfer-ready level as shown in FIG. 1, the workpiece receives a translational impulse from transfer nozzle 6a exactly calculated to take the workpiece to the next station 1b. In doing so the workpiece slides over the track of the guideway 11 while the guide rails 12 exert a lateral constraint on it.

In this context it can be seen that it is of particular advantage that the coolant/lubricant emulsion present in the machine can be used for propelling the workpieces, the emulsion being taken from the cooling and lubricating system and being brought if necessary to the pressure required, e.g. 1 to 10 bars, with an additional pump. The lubricating action of this emulsion enhances the transfer of a workpiece via the guideway 11 along the guiderails 12 — the coefficient of friction being significantly lowered — and a higher transfer rate is rendered possible. This fact is of decisive importance with presses of this kind which are operated at rates of between 100 and 200 strokes per minute.

The propelling nozzles 6a to 6d and the positioning nozzles 10a to 10d of course work in exact coordination with each other so that each nozzle fires at the right instant. Additional nozzles can of course be mounted on the press as required so that the motion of the workpieces can be corrected between two forming stations.

After the workpiece C has arrived at forming station 1b and been brought into position against receiving members 8b19b by positioning nozzle 10b, a further forming operation takes place which is followed by another translational impulse, this time from propelling nozzle 6b. In this way the workpiece can be extremely rapidly propelled from one station to another and exactly positioned.

Since no mechanical transfer members of any kind are required, the press can be operated at an extremely high rate, the upper limit to which is not determined by the transfer system but by the rate at which the forming tools are able to work.

FIG. 2 shows that the jet of emulsion delivered by propelling nozzle 6a can also be regulated by a baffleplate 15 instead of the valve 7 (FIG. 1), the plate 15 being withdrawn and placed in front of the nozzle mouth by a control means 16 (e.g. a switch actuated by compressed air) in time with the working rythm of the forming tools (double-headed arrow). Furthermore a device 17 can be mounted on receiving member 8a to check the position of the workpiece and switch the machine off if a workpiece is incorrectly positioned. This device, which responds to a contact stimulus, is known and will therefore not be described in any detail.

Propelling nozzle 6b is controlled by a valve 18 which is linked to a switching means 19 and periodically cuts off the jet of emulsion propellant.

A further variant is used on propelling nozzle 6c. Here the nozzle is rotatably mounted on a pivot 20 and can be rotated through the angle α by an arm 21. The arm 21 is actuated by a switch 22.

To regulate the jet of emulsion from nozzle 6d a baffleplate 23 is used, the motion of which is linked with that of the forming tool, e.g. with that of the punch or the stripper.

All the propelling nozzles can be fed with emulsion through the common feed line S.

The various ways described so far of regulating the flow of emulsion through the propelling nozzles can of course also be applied to the positioning nozzles 10a to 10d. FIG. 2 also shows a further method of regulation in which a baffleplate 24 can be rotated by a rod 25 about an axis 26. Since the joint 28 describes a circular arc when the device is in operation, the whole control system 29 must be able to pivot about an axis 27. The control system 29 may for instance be a pneumatically or hydraulically operated piston/cylinder combination. In this case too, all the positioning nozzles 10a to 10d can be controlled via a common actuating rod 30 from the main drive of the machine and all supplied with emulsion through a common feed line 31.

Figure 3:
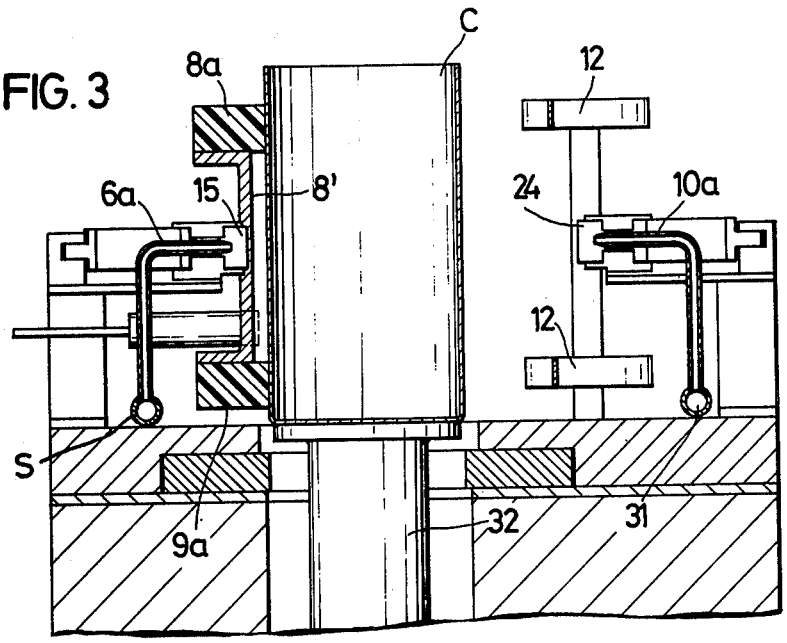
FIG. 3 is a section along the line III—III in FIG. 2.
Figure 4:
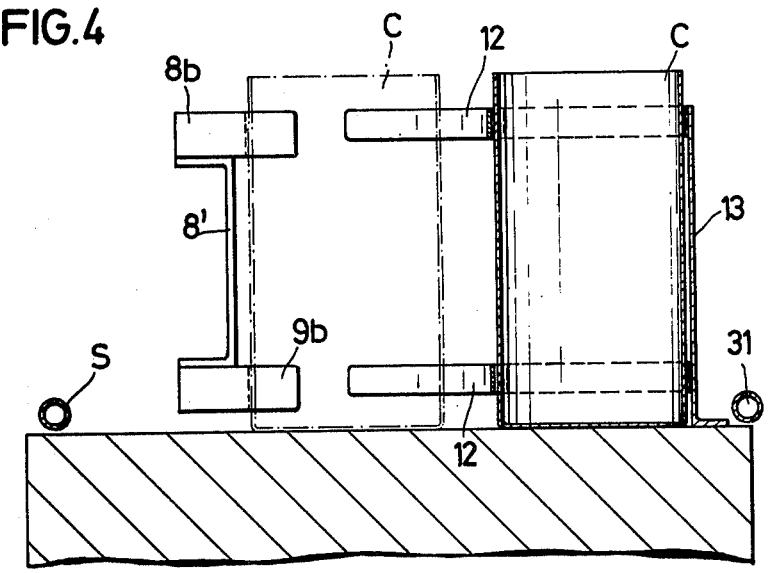
FIG. 4 is a section along the line IV—IV in FIG. 2.

FIG. 3 shows the workpiece on one of the machine's ejectors 32. The workpiece is standing exactly in the machining position against the two receiving members 8c, 9c which are connected to each other by a U-section 8'.

Figure 5:
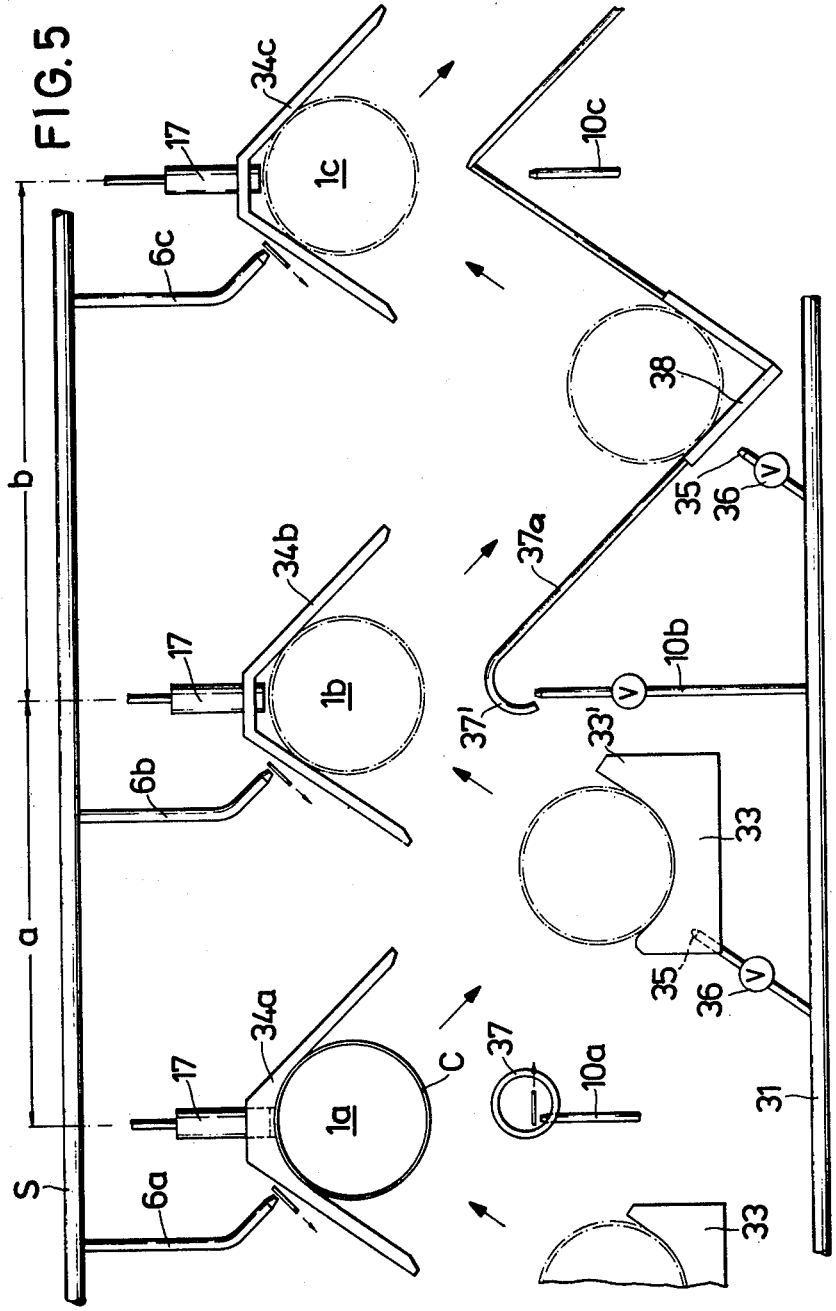
FIGS. 5–7 show variants of the transfer means.

A variant of the transfer means can be seen in simplified plan view in FIG. 5. In this variant the workpieces C are not transferred directly from one forming station 1a to the next 1b but via an intermediate station 33 at which the workpiece C is not subjected to a forming operation. The intermediate station 33 is intended particularly for use with equipment in which the mutual separation of the forming stations 1a and 1b is large and the translational impulse from a single propelling nozzle therefore insufficient to bridge this gap. The transfer means again includes receiving members 34a from which the workpiece C is propelled to the intermediate station 33 by a burst of emulsion from a propelling nozzle 6a. At the intermediate station 33 the workpiece receives a further impulse from propelling nozzle 35 which is controlled by a valve 36. The workpiece thus finally reaches forming station 1b.

In this variant the workpiece C is guided partly by the elongated receiving member arms 34a to 34c, partly by vertical tubes 37 and partly by lateral extensions 33' of the intermediate station or — as shown in FIG. 1 — by guide rails 37a which may for instance have curved ends 37'. It can be seen from the embodiment represented by the further intermediate station 38 that the station does not necessarily have to fit the cylindrical shape of the workpiece C.

A common feature of all the receiving members 8a to 8d (FIG. 2) and 34a to 34c (FIG. 5) must be that their receiving and guide surfaces against which the workpiece C rests or along which it travels extend outwards in such a way that they guide the workpieces in the required direction. This means that in the embodiment having curved guide members the line T drawn from the end of the inner guide rail to the nearest point of contact P of the workpiece and the receiving member is a tangent to the receiving member at the point P (FIG. 2).

Appropriate rearrangement of the forming tools would enable mechanical machining operations to be carried out at the intermediate stations 33 and 38 too.

Figure 6:
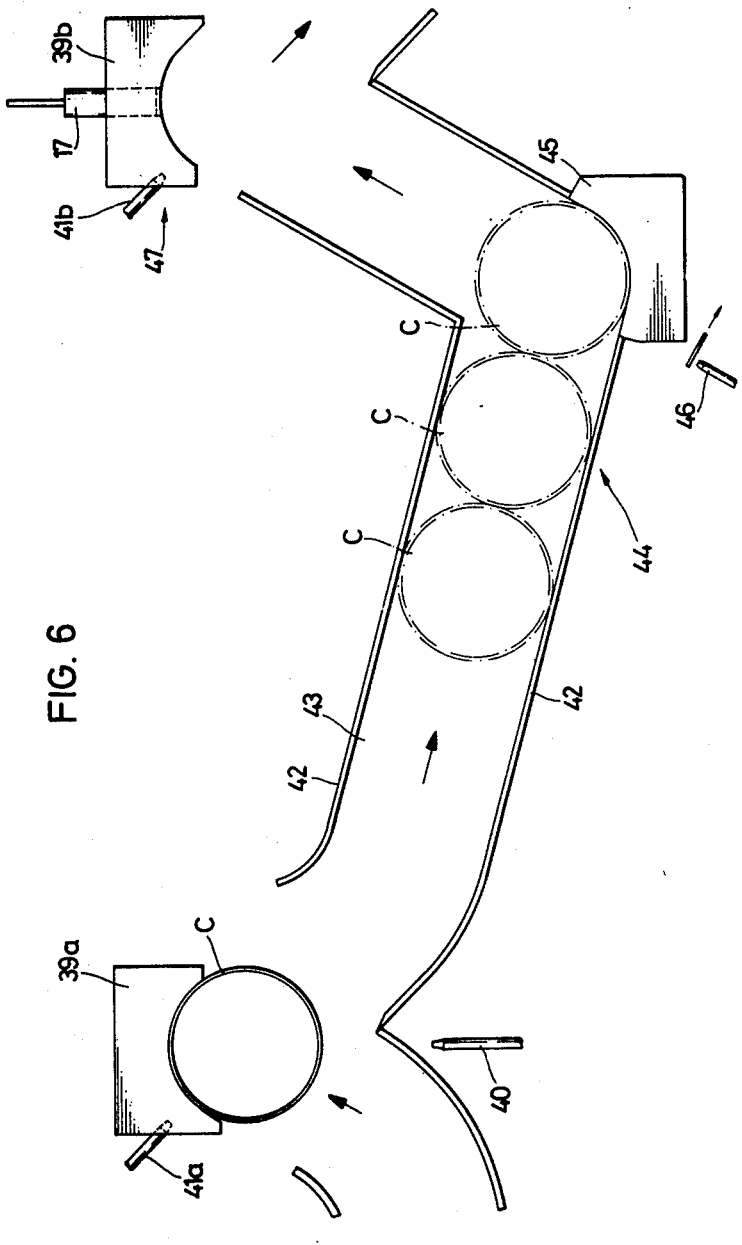

FIG. 6 shows the application of the invention to a plant in which the workpieces are either transferred from one machine to the other or in which the distances between stations on the same machine are large.

A workpiece C arrives at the receiving member 39a, is exactly positioned by the jet from the positioning nozzle 40 and then machined. On completion of the machining operation the propelling nozzle 41a comes into action. The workpiece is sent on a guideway 43 bounded by guide rails 42 to an intermediate station 44 which represents a kind of intermediate holding station or buffer station. As soon as a workpiece C has worked its way down to the receiving member 45 it is sent on by propelling nozzle 46 to the next machining station 47 which also has a receiving member 39b and a propelling nozzle 41b.

Figure 7:
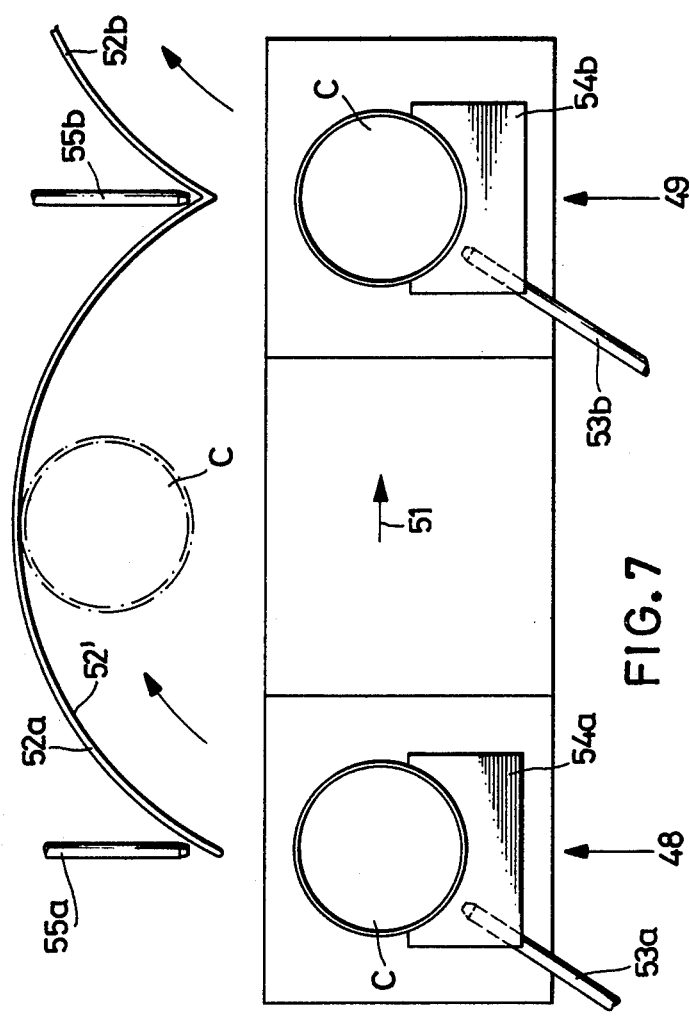

During the description of the embodiments discussed so far, it has been tacitly assumed that the forming tools of the machines involved work along a vertical axis — in other words that the ironing punch moves vertically downwards into the die. Application of the principle of the invention to machines in which the working axis is horizontal is however also possible as is depicted in FIG. 7. For the sake of simplicity only two horizontal stations 48 and 49 are shown and at the same time it is assumed that workpieces C are to be transferred in the direction indicated by arrow 51 from one station 48 to the other 49. In this case too, direct transport of workpieces in the actual direction of arrow 51 is not possible as the receiving members would then lie directly in the path of the workpieces and would have to be moved out of this path to avoid collision with the workpieces. For this reason a guideway 52a, along the underside 52' of which the workpieces C travel, is positioned above the stations. The workpieces C are thus shot by a propelling nozzle 53a in a direction tangential to the guideway 52a, the guideway ending pointing tangentially towards the receiving member 54b. Positioning nozzles 55a and 55b are also provided to ensure exact positioning of the workpieces C. In the regions of the orifices of these positioning nozzles 55a/55b there is a hole in the guideway 52a. Another propelling nozzle 53b shoots the machined workpiece towards the next guideway 52b.

As has already been mentioned the propelling nozzles operate either with a liquid (preferably the liquid already used in the operation of the machine) or a liquid/gas mixture. Supplying the propelling nozzles with gas alone, in particular compressed air, results in the appearance of several undesirable side-effects, thus showing the use of this propellant to be inexpedient in the case of the present invention. The following drawbacks in particular could be observed in the transfer of hollow metal components on a multi-stage forming press:

1. The stability of the hollow components during the transfer operation leaves a lot to be desired; i.e., they easily lift off from the underlying guideway track and tip over.
2. Undesirable rebound effects can easily occur owing to the compressibility of air.
3. Energy consumption when compressed air is used is incomparably higher than when the propellant is the coolant/lubricant emulsion.
4. A well-defined and well-directed jet of compressed air can only be produced with difficulty, and even then it only remains so for a short distance.

These disadvantages are eliminated by supplying the propelling nozzles with a liquid or a liquid/gas mixture. In the latter case emulsion and compressed air, for example, are supplied to a mixing nozzle and emerge together from the nozzle orifice.

The way in which the propellant flow is regulated must be adapted from case to case to suit local conditions. In general it can however be said that control of the supply to the nozzles by a periodically activated shut-off valve leads on the one hand to undesirable pressure waves in the supply line and on the other hand requires a relatively high investment in equipment which has a restricted lifetime. Mechanically blocking a jet which is emerging continuously from the nozzle has therefore proved to be more expedient in the present case. As discussed in conjunction with the illustrative embodiments, either a baffleplate which periodically cuts off the jet near the nozzle orifice can be employed or the nozzle itself can be turned periodically through a particular angle. Both methods have the advantage of the liquid flow remaining constant, so that pressure waves and their undesirable repercussions on the whole hydraulic system are avoided.

When a single propelling nozzle is used per machining station it has proved expedient for the jet to strike the article to be transferred slightly below the article's center of gravity. It would of course also be possible to employ several propellant jets, in which case the propelling nozzle orifices could be round or oblong.

The scope of application of the transfer means described could in many cases also encompass machines working at very low rates, an acceleration of the rate to 250 articles per minute and higher being quite readily possible.

It has already been mentioned that the articles being transferred should be first positioned on arrival at a forming station.

This is particularly necessary when for instance a non-cutting forming operation is carried out by deep drawing or ironing, in which case the article being formed must be positioned so that it lies exactly coaxial to the punch. Instead of the positioning nozzles used for this purpose in the embodiments described so far, suction nozzles or holding magnets could be mounted on the receiving members instead.

The guideway tracks can for example be made of a plastic such as polytetrafluoroethylene, or of stainless steel.

Although the embodiments illustrated and described refer to the ironing of metal cans, the transfer means described can certainly be employed on any multistage machine on which the articles being transferred are subjected to any kind of mechanical machining operation.

What we claim is:

1. A method of transferring articles between successive work stations at which working operations are effected, said method comprising the steps of:
   a. positioning an article at a first work station,
   b. providing at each work station a jet of fluid material including a liquid medium,
   c. directing said jet of fluid material by an amount effective in one direction at the article located in the first work station to propel the article toward a successive work station,
   d. guiding the article along a defined path to the successive work station after the article has been propelled by said jet, and
   e. positioning said article in the successive work station to prepare for a work operation,
   f. the defined path is curved between the successive work stations and has an inner and outer side the article is guided by bearing against the outer side,
   g. the positioning of said article in the successive work station includes receiving said article along the inner side of said path.

2. A method as defined in claim 1 wherein the jet directing step is effected at a predetermined frequency in a corresponding rhythm to the frequency of operations at the successive work stations.

3. The method as defined in claim 1 wherein the curved path is defined on the horizontal, and the article is guided on the outer side of the curved path.

4. The method as defined in claim 1 wherein the curved path is defined on the vertical and the article is guided on both the inner and outer sides of the curved path.

5. The method as defined in claim 1 wherein the working operations comprise using forming tools positioned one behind the other to manufacture hollow metal components,
said forming tools having a working axis disposed in a vertical disposition,
said hollow metal components are transferred between the successive work stations along a horizontally disposed, curved surface,
the components being guided on the outer side of the curved path.

6. The method as defined in claim 1 wherein the working operations comprise using forming tools positioned one behind the other to manufacture hollow metal components,
said forming tools having a working axis disposed in the horizontal disposition,
said hollow metal components are transferred between the successive work stations along a vertically disposed, curved path,
the components being guided on both the inner and outer sides of the curved path.

7. The method as defined in claim 1 including the step of:
holding the article at a location intermediate the successive work stations while being guided along said defined path.

8. A method of transferring articles between successive work stations at which working operations are effected, said method comprising the steps of:
   a. positioning an article at a first work station,
   b. providing a jet of fluid material including a liquid medium used in said working operations,
   c. directing said jet of fluid material at the article located in the first work station to propel the article in a direction toward a successive work station,
   d. guiding the article along a defined path to the successive work station, and
   e. positioning said article in the successive work station to prepare for a work operation.

9. The method as defined in claim 8 wherein
the working operations comprise using forming tools positioned one behind the other to manufacture hollow metal components,
said liquid medium includes the same coolant and lubricant emulsion used for the forming tools.

10. A method of transferring articles between successive forming work stations at which metal forming operations are effected, said method comprising the steps of:
   a. positioning an article at a first work station,
   b. providing at each work station a first jet of fluid material including a liquid medium,
   c. directing said first jet of fluid material at the article located in the first work station to propel the article in a first direction toward a successive work station,
   d. guiding the article along a curved path having an inner side and an outer side to the successive work station when the article is propelled against the outer side, and
   e. providing an article receiving means on the inner side of said curved path and a second jet of fluid material on the outer side of said path at each successive work station,
   f. said second jet directing fluid medium in a second direction at said article immediately upon reaching a position adjacent said receiving means to prepare for a forming operation.

11. The method as defined in claim 10 wherein the fluid material of said second jet comprises a gaseous medium.

12. A method of transferring articles between successive work stations at which working operations are effected, said working operations comprise using a coolant and lubricant emulsion on forming tools positioned one behind the other to manufacture hollow metal components, said method comprising the steps of:
   a. positioning an article at a first work station, b. providing a jet of fluid material including a liquid medium having the same coolant and lubricant emulsion used for said forming tools,
c. directing said jet of fluid material at the article in the first work station to propel the article in a direction toward a successive work station,
d. guiding the article along a defined path to the successive work station, and
e. positioning said article in the successive work station to prepare for a work operation.

13. The method as defined in claim 12 wherein the positioning of said article in the successive work station includes receiving said article at the successive work station and directing at least one jet of fluid material at the article immediately upon being received at said successive work station.

14. The method as defined in claim 13 wherein the fluid material of said at least one jet at said successive work station comprises the same coolant and lubricant emulsion used for the forming tools.

15. An assembly for transferring articles between successive work stations at which working operations are effected, said assembly comprising:
a. means for positioning an article at a first work station,
b. means located at each work station for providing a jet of fluid material including a liquid medium,
c. means for directing said jet of fluid material at an amount effective at the article located in the first work station to propel the article in one direction toward a successive work station,
d. means for guiding the article along a defined path to the successive work station after the article has been propelled by said jet directing means,
e. said defined path is curved between the successive work stations and has an inner side guide means and an outer side guide means, the article is guided by bearing against said outer side guide means, and
f. means for positioning said article in the successive work station to prepare for a work operation,
g. each said positioning means includes a receiving means on one side of the path and having a receiving surface in alignment with the inner side guide means.

16. The assembly as defined in claim 5 wherein the jet directing means is actuated at a predetermined frequency in a corresponding rhythm to the frequency of operations at the successive work stations.

17. The assembly as defined in claim 15 wherein said jet directing means includes at least one nozzle for propelling a jet of the fluid material at said article.

18. The assembly as defined in claim 17 wherein said jet directing means further includes means for regulating the directed jet of fluid material against the article to operate in time with the frequency at which the articles are transferred.

19. The assembly as defined in claim 18 wherein said regulating means includes shut-off valves which periodically interrupt the jet of fluid material in time with the desired rate of transfer of articles.

20. The assembly as defined in claim 18 wherein forming tools are horizontally disposed at each work station positioned one behind the other to manufacture hollow metal components,
said jet directing means includes at least one nozzle for propelling a jet of the fluid medium at said article,
said guiding means includes an upward convex guideway located between each pair of successive forming tools,
the propelling nozzles being aimed in such a direction that the articles are shot upwardly at an angle and are guided by the downwardly facing surface of the guideway.

21. The assembly as defined in claim 18 wherein forming tools are vertically disposed at each work station positioned one behind the other to manufacture hollow metal components,
said guiding means includes a curved guideway located above a horizontally disposed guide floor to link the successive work stations to each other,
said guideway having a lateral guide member at least on an outer side thereof.

22. The assembly as defined in claim 21 wherein said guideway has a further lateral guide member on the inner side thereof.

23. The assembly as defined in claim 18 wherein said guiding means includes a guideway made of plastic such as polytetrafluoroethylene.

24. The assembly as defined in claim 18 wherein said guiding means includes a guideway made of stainless steel.

25. The assembly as defined in claim 15 wherein each said positioning means includes receiving members having at least a surface facing toward the transferred article,
the shock absorption capacity of said surface being chosen to suit the shape, material and momentum of the approaching article in such a way that the article is positioned against the receiving member.

26. The assembly as defined in claim 15 wherein said guiding means includes removably mounted guideways.

27. An assembly for transferring articles between successive work stations at which working operations are effected, said assembly comprising:
a. means for positioning an article at a first work station,
b. means for providing a jet of fluid material including a liquid medium,
c. at least one nozzle means for directing a continuous jet flow of fluid material at the article located in the first work station to propel the article in a direction toward a successive work station,
d. means for guiding the article along a defined path to the successive work station,
e. means for positioning said article in the successive work station to prepare for a work operation, and
f. baffle means to periodically block the jet of fluid material from said nozzle means.

28. The assembly as defined in claim 27 wherein the baffle means comprises rebound elements which are controlled by control means in such a way that they periodically move into the path of the jet and withdraw again.

29. The assembly as defined in claim 27 wherein the baffle means comprises pivoting devices which periodically pivot the propelling nozzles away from the direction of the intended path of the articles.

30. An assembly for transferring articles between successive work stations at which working operations are effected, said assembly comprising:
 a. means for positioning an article at a first work station,
 b. means for providing a jet of fluid material including a liquid medium,
 c. means for directing said jet of fluid material at the article located in the first work station to propel the article in a direction toward a successive work station,
 d. means for feeding a liquid medium used in the working operations into the jet directing means,
 e. means for guiding the article along a defined path to the successive work station, and
 f. means for positioning said article in the successive work station to prepare for a work operation.

31. An assembly for transferring articles between successive work stations at which working operations are effected, said assembly comprising:
 a. means for positioning an article at a first work station,
 b. means for providing a jet of fluid material including a liquid medium,
 c. means for directing said jet of fluid material at the article located in the first work station to propel the article in a direction toward a successive work station,
 d. means for guiding the article along a defined path to the successive work station,
 e. means for positioning said article in the successive work station to prepare for a work operation, and
 f. forming tools are disposed at each work station positioned one behind the other to manufacture hollow metal components,
 g. said jet providing means including means for feeding the same coolant and lubricant emulsion used for the forming tools to the jet directing means.

* * * * *